United States Patent [19]

Krebs et al.

[11] 4,246,114
[45] Jan. 20, 1981

[54] AEROBIC WASTE TREATMENT PACKAGE

[75] Inventors: J. Robert Krebs, Dayton, Ohio; Awtar S. Khera, Erlanger, Ky.

[73] Assignee: Multi-Flo, Inc., Dayton, Ohio

[21] Appl. No.: 960,875

[22] Filed: Nov. 15, 1978

[51] Int. Cl.³ .............................................. B01F 3/06
[52] U.S. Cl. .................................. 210/151; 210/170; 210/203; 210/218; 210/220; 210/323.2
[58] Field of Search .................. 55/379; 210/150, 151, 210/170, 203, 218, 220, 323 T, 483, 486

[56] References Cited

U.S. PATENT DOCUMENTS

| | | | |
|---|---|---|---|
| 1,696,735 | 12/1928 | Scoville | 210/323 T X |
| 1,986,570 | 1/1935 | Gans | 210/323 T |
| 2,013,776 | 9/1935 | Wiesman | 210/323 T X |
| 3,161,589 | 12/1964 | Burckhalter | 210/323 T X |
| 3,563,383 | 2/1971 | Hellquist et al. | 210/151 X |
| 3,817,864 | 6/1974 | Carlson et al. | 210/170 |
| 3,923,656 | 12/1975 | Krebs et al. | 210/151 X |

Primary Examiner—Robert H. Spitzer
Attorney, Agent, or Firm—Biebel, French & Nauman

[57] ABSTRACT

An improved aerobic waste treatment package which both simplifies maintenance of the system and increases the interval between necessary maintenance through the use of a removable surge bowl which forms part of a centrally disposed, large capacity, surge chamber positioned above the waste treatment holding tank. The package also simplifies maintenance by permitting removal of the surge bowl without disconnecting the electrical connections to the package and through the use of a simplified system for suspending porous filter bags from a hanger plate extending across the top of the holding tank.

5 Claims, 5 Drawing Figures

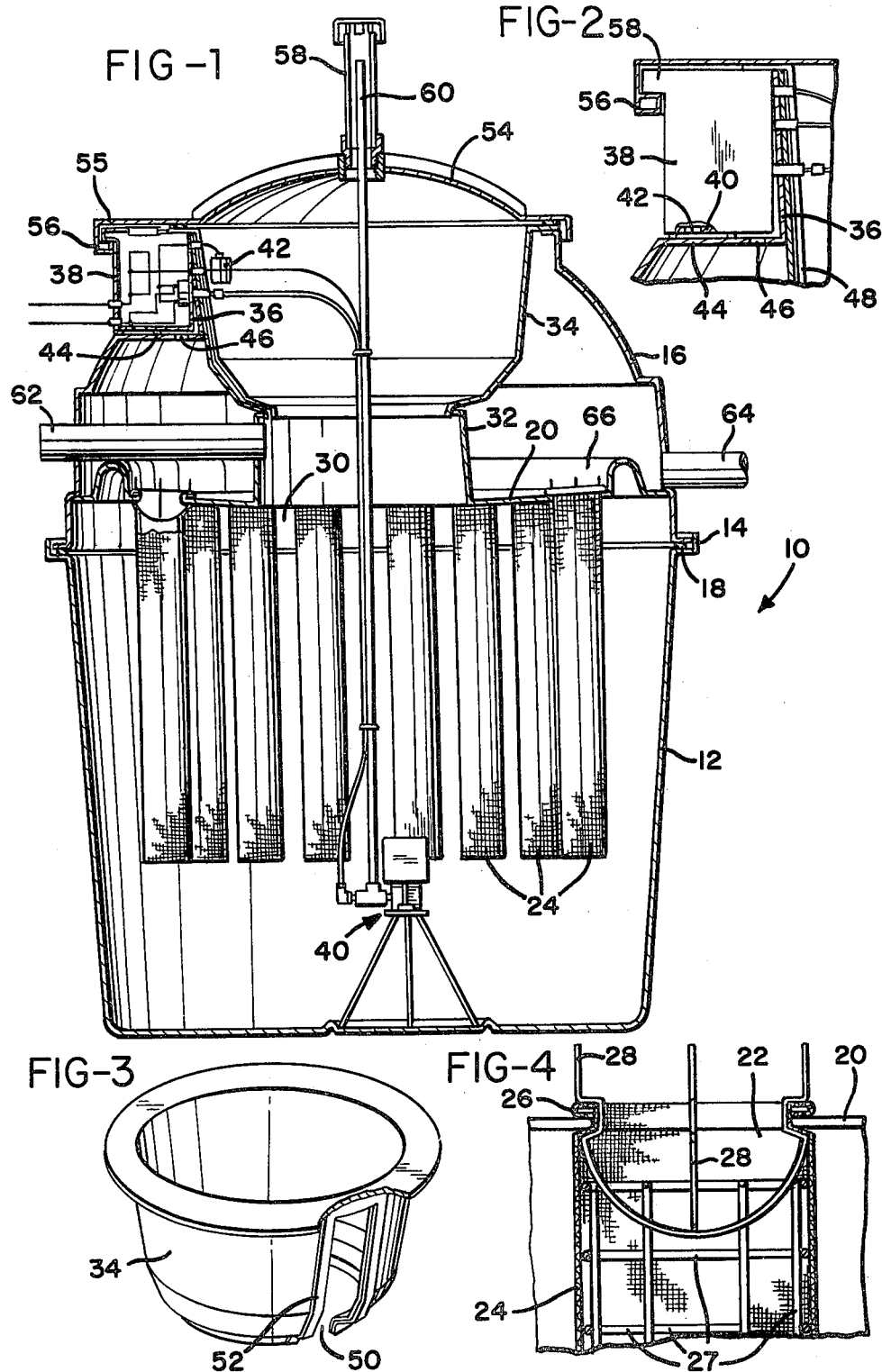

AEROBIC WASTE TREATMENT PACKAGE

BACKGROUND OF THE INVENTION

U.S. Pat. No. 3,923,656, assigned to the assignee of the present application, discloses an aerobic waste treatment system in which waste material is treated under aerobic conditions to transform it into an essentially clear effluent.

Despite the efficiency of this system there is of course a need for maintenance work to be performed at certain intervals determined by the usage of the system. For example, it is necessary from time to time to remove the porous filter bags and either clean them and replace them or simply replace them with new bags.

With the design disclosed in the above noted patent access to the interior of the system to change the filter bags is somewhat time consuming, not only because of the manner in which the bags are suspended from the hanger plate, but also because of the limited access available to the interior of the system and the necessity of disconnecting certain electric controls if the entire outer shell is to be removed to provide more ready access.

Thus despite the efficiency of the system described in the above noted patent it will be apparent that routine maintenance can become a time consuming chore and detract from customer acceptance of the system.

SUMMARY OF THE INVENTION

The present invention provides an aerobic waste treatment package which, while operating as efficiently as prior art aerobic waste treatment systems, provides significant advantages through simplified maintenance and decreased frequency of necessary maintenance.

Specifically, the present invention provides an aerobic waste treatment package having a large capacity surge chamber defined in part by a removable surge bowl. Because the surge bowl is readily removable from the system access to the interior of the system for maintenance is greatly facilitated. Additionally, the increased volume provided by the removable surge bowl increases the duration of filter life by accommodating surges of waste material during peak in-flow periods, eliminating high flows through the porous filter bag which would tend to clog the bags and reduce their efficiency.

Additionally, all electrical connections are mounted in an electric control box which is received in a specially shaped portion of an outer shell mounted on the holding tank, and the surge bowl is provided with a cut out portion which is disposed at the position of the electric control box to accommodate various connections from the control box into the surge chamber while at the same time permitting removal of the surge bowl without disturbing the various electrical connections.

Changing of the porous filter bags themselves is simplified by using a hanger plate which has an essentially flat surface around the area of openings through which the porous filter bags extend and spring clips to hold the porous filter bags in the openings.

An access cover is provided through which the entire surge bowl can be removed and the access cover is attached to the outer shell by means of a detachable hinge which simplifies the opening of the package for access to its interior.

These and other features and advantages of the package will become apparent from the following description.

BRIEF DESCRIPTION OF THE DRAWINGS

FIG. 1 is a cross sectional view of the aerobic waste treatment package of the present invention;

FIG. 2 is an enlarged view of a portion of FIG. 1;

FIG. 3 is a perspective view of a surge bowl in accordance with the present invention;

FIG. 4 is an enlarged view of a portion of a hanger plate associated with the package showing the manner of attaching the porous bags to the hanger plate.

DESCRIPTION OF THE PREFERRED EMBODIMENTS

Figure 5:
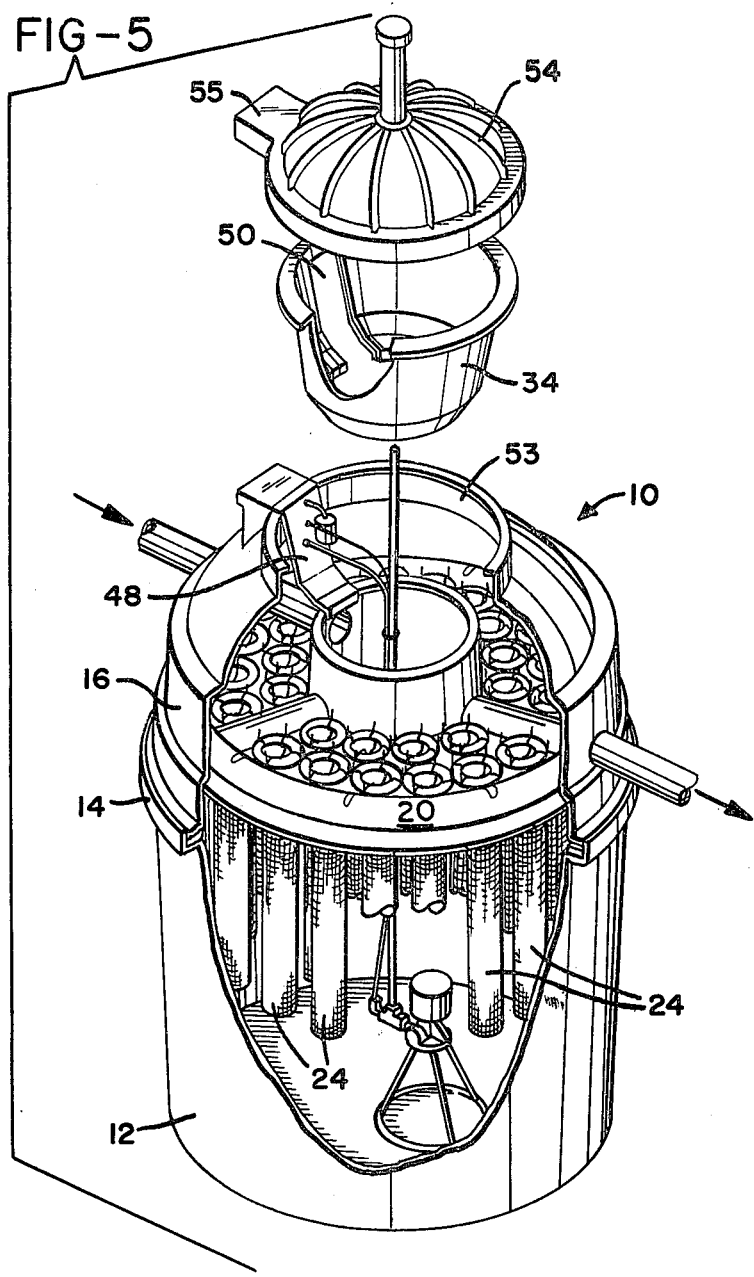
FIG. 5 is an exploded perspective view of the waste treatment package of the present invention.

The waste treatment package 10 of the present invention includes a substantially cylindrical holding tank 12 having an open mouth terminating in an outwardly turned lip 14. An outer shell 16 rests on the lip 14 with gasket material 18 interposed between the two members and a hanger plate 20 is attached to the outer shell 16 by adhesives or the like.

A plurality of openings are formed through the hanger plate 20 and areas of the hanger plate upper surface adjacent each of the openings 22 are substantially flat. A plurality of porous filter bags 24 extend downwardly through the openings 22, have outwardly turned beads 26 at their upper ends and, as best seen in FIG. 4, are provided with expanders 27, which hold the bags 24 open. Pairs of generally U-shaped clips 28 are received within the upper ends of each of the porous bags 24 to secure these bags to the hanger plate and restrict movement of expanders 27 during heavy surges.

The hanger plate 20 also has a medially disposed opening 30 surrounded by a vertically extending wall 32. A surge bowl 34 of substantially greater diameter than the diameter of the vertically extending wall 32 is removably mounted on an upper edge of the vertically extending wall, as best seen in FIGS. 1 and 5 of the drawings.

With reference to FIGS. 1 and 2 of the drawings it will be noted that a portion 36 of the outer shell 16 is shaped to receive an electrical control box 38. The electrical control box contains the circuitry needed for the operation of an aerator 40 and various warning and control devices, such as the level alarm 41. Such controls and alarms are described in more detail in the above noted U.S. Pat. No. 3,923,652 and do not per se form part of the present invention.

Condensate can collect within the electrical control box 38 and to permit such condensate to drain from the box a bottom floor 40 of the box 38 is provided with a drainage opening 42 through which the condensate can drain. An opposing bottom wall 44 of portion 36 of the shell 16 is also provided with a drainage opening 46 to permit condensate from the control box 38 to drain into the system. It will be noted from FIGS. 1 and 2 that the drainage openings 42 and 46 are offset from each other to permit the condensate to drin from the control box 38 but prevent back flow of material within the package into the control box 38.

A downwardly extending plate 48 is attached to portion 36 of the shell 16 and has a contour which conforms to the outer surface of the surge bowl 34. Surge bowl 34 has an opening 50 formed therethrough which can be aligned with the control box 38 and a strip of gasket material 52 extends about the opening 50 to form a seal with opposing surfaces of the plate 48.

Outer shell 16 has an opening 53 of sufficient size to permit the removal of the surge bowl 34 from the package. Opening 53 is closed by a cover 54 which has an extension 55 terminating in an inwardly directed flange 56 which may be hooked under a projection 58 on the control box 38. Any suitable latch means can be mounted on the cover if desired at a point, for example, opposite the portion 55. Also mounted on the cover 54 is a removable vent pipe 58 receiving an upper end of an air intake line 60 which leads to the aerator 40.

An inlet line 62 extends through a wall of the shell 16 and the vertically extending wall 32. An outlet line 64 also extends through the shell 16, preferably at a lower level than the inlet line 62.

Briefly, and as described in more detail in U.S. Pat. No. 3,923,652, the aerobic waste treatment package receives waste material through the inlet line 62 into the surge chamber, which accommodates heavy inflows, then passes down through the opening 30 in the hanger plate into the holding tank 12 where it is treated by aerobic bacteria which colonize principally on the outer surfaces of the porous filter bags 24 and break the waste material down into an essentially clear effluent.

The effluent passes through the filter bags 24 when incoming waste displaces material already held in the holding tank, with the effluent passing over a weir 66 formed on the hanger plate and out of the outlet pipe 64. The aerator 40 draws air into the system to support the aerobic bacteria during the treatment process.

When it is necessary to service the system, as for example when it is necessary to clean or replace the porous bags 24, the vent 58 is removed and then the cover 54, and the surge bowl 34 is lifted out to permit ready access to the interior of the package. The clips 28 are also easily removed, allowing the bags 24 to be lifted out for cleaning or replacement. Following maintenance operations the surge bowl is replaced, with the gasket 52 forming a seal with the plate 48. The cover 54 and vent are then installed with the inwardly directed flange of the cover hooked beneath the projection 58 on the electrical box 38.

From the above it will be seen that the present invention provides an improved aerobic waste treatment package.

While the form of apparatus herein described constitutes a preferred embodiment of the invention, it is to be understood that the invention is not limited to this precise form of apparatus, and that changes may be made therein without departing from the scope of the invention.

What is claimed is:

1. In an aerobic waste treatment package, including an open mouth holding tank, a hanger plate extending across the open mouth of said holding tank, a plurality of porous bags suspended from said hanger plate through openings therein into said holding tank, means defining a medial opening through said hanger plate, a vertically extending wall disposed about said medial opening, means defining an effluent outlet from said package above said hanger plate, means defining an inlet through said vertically extending wall, an outer shell extending upwardly from an upper edge of said holding tank, an access opening in an upper portion of said outer shell and an access cover covering said access opening in said shell, the improvement comprising:
   a surge bowl received within said outer shell,
   said surge bowl having a lower edge adapted to be received by and rest upon an upper edge of said vertically extending wall,
   said surge bowl increasing in diameter from said lower edge thereof to a maximum diameter above said lower edge substantially in excess of the maximum diameter of said vertically extending wall,
   said surge bowl having an upper edge received by and in engagement with an upper edge of said outer shell, and
   said maximum diameter of said surge bowl relative to the diameter of said access opening is such that said surge bowl can be removed from within said outer shell through said access opening.

2. The package of claim 1 wherein:
   said hanger plate has a plurality of openings therethrough through which said porous bags extend into said holding tank,
   areas of an upper surface of said hanger plate adjacent said openings are substantially flat, and
   spring clip means secure said porous bags to said hanger plate.

3. In an aerobic waste treatment package including an open mouth holding tank, a hanger plate extending across the open mouth of said holding tank, a plurality of porous bags suspended from said hanger plate through openings therein into said holding tank, means defining a medial opening through said hanger plate, a vertically extending wall disposed about said medial opening, means defining an effluent outlet from said package above said hanger plate, and means defining an inlet through said vertically extending wall, the improvement comprising;
   a large capacity surge chamber defined partially by said vertically extending wall,
   said surge chamber further including a surge bowl cooperating with and disposed above said vertically extending wall,
   an outer shell extending upwardly from an upper edge of said holding tank and enclosing said surge bowl,
   an electric control box received in a portion of said outer shell, and
   means defining an opening in a wall of said surge bowl in alignment with said electrical control box whereby said surge bowl can be removed from said system without disconnecting electrical components associated with said system.

4. The package of claim 3 wherein:
   said shell has a portion thereof shaped to receive said electric control box therein,
   said shaped portion of said shell has a bottom floor,
   said electric control box is received in said shaped portion of said shell and has a bottom floor disposed above said bottom floor of said shaped shell portion, and
   drainage openings are formed in said bottom floors of said shaped shell portion and said electric control box in offset relationship to each other.

5. The package of claim 3 further comprising:
   gasket means interposed between an outer periphery of said opening in said surge chamber wall and opposing surfaces of said portion of said outer shell receiving said electric control box.

* * * * *